INVENTOR.
William Sinclair
BY Swan, Frye & Hardesty
ATTORNEYS.

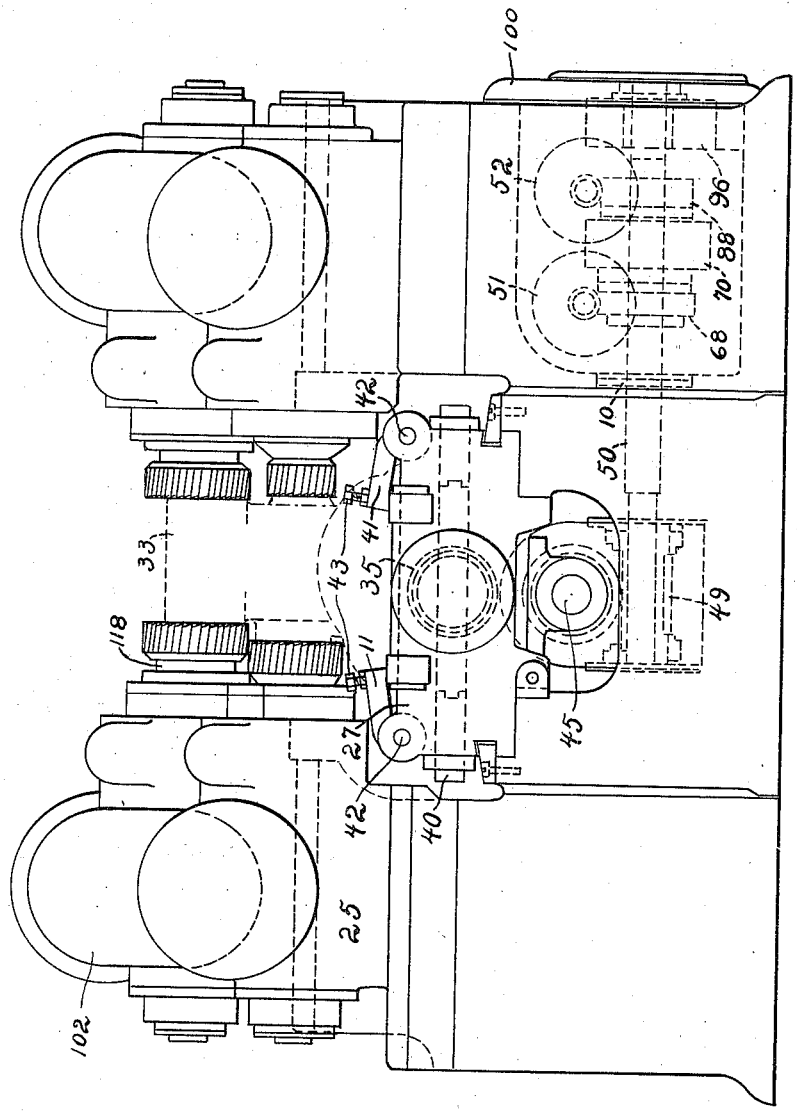

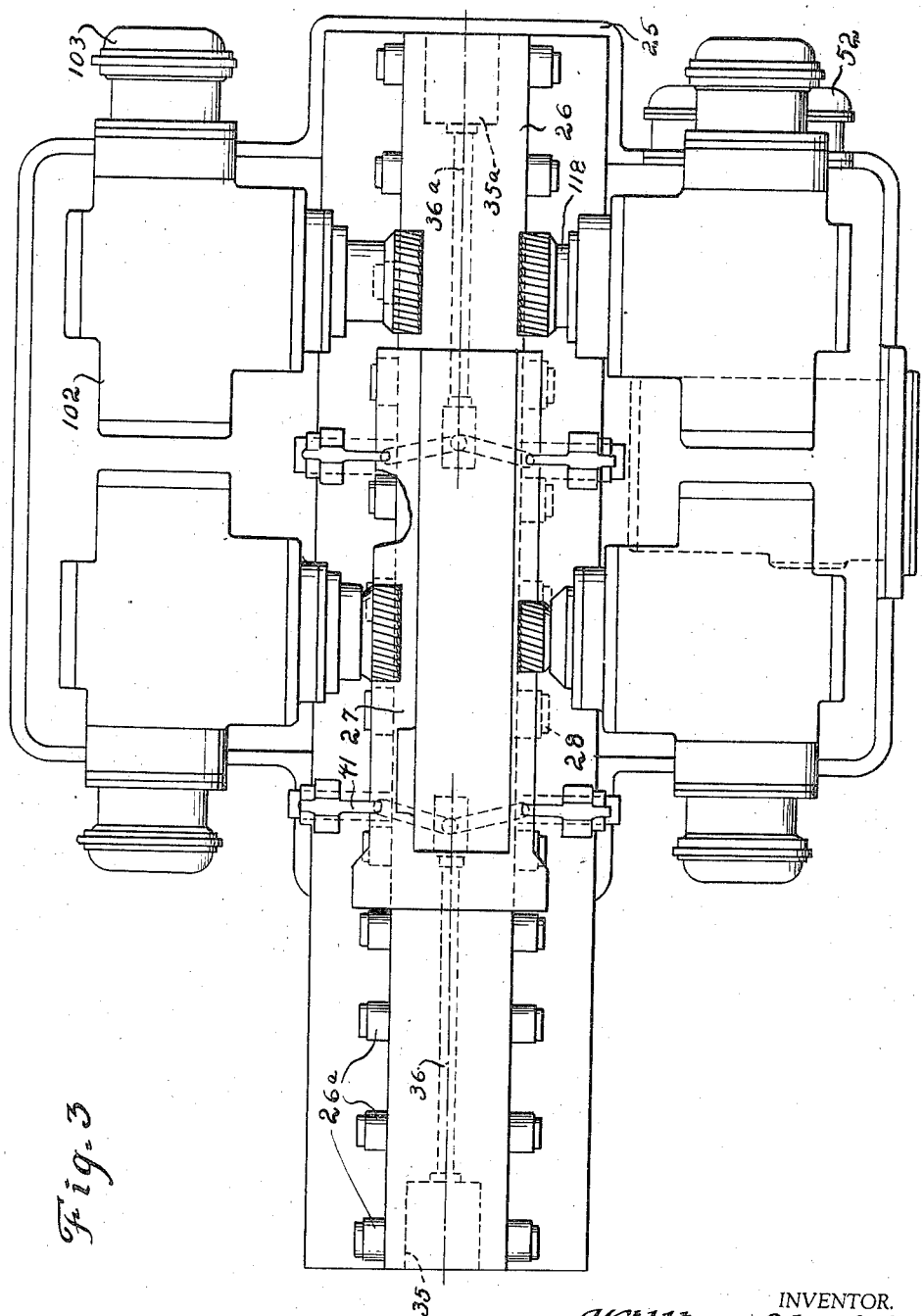

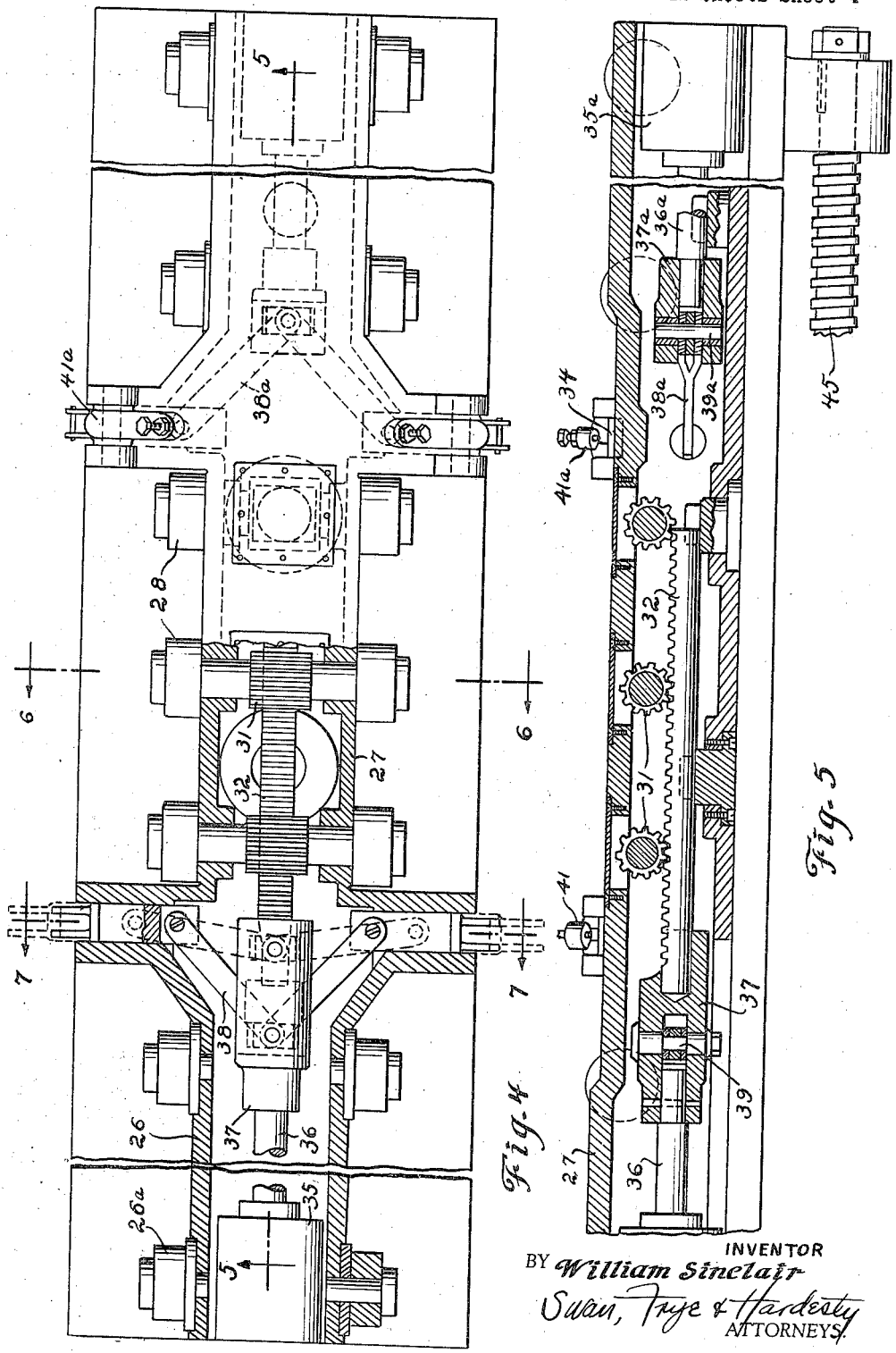

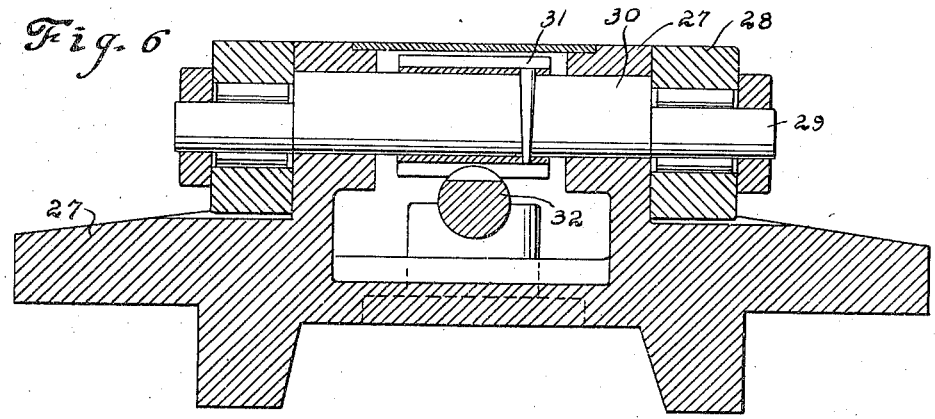
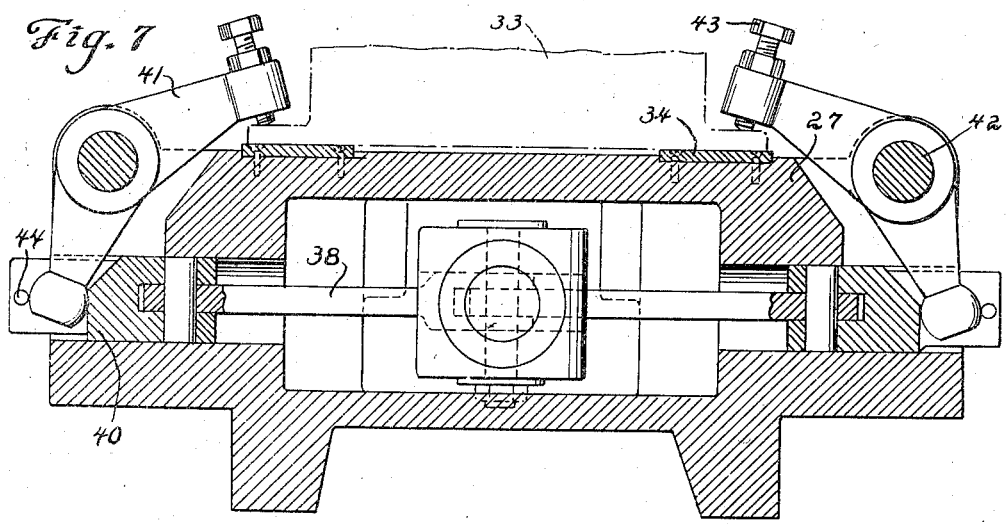
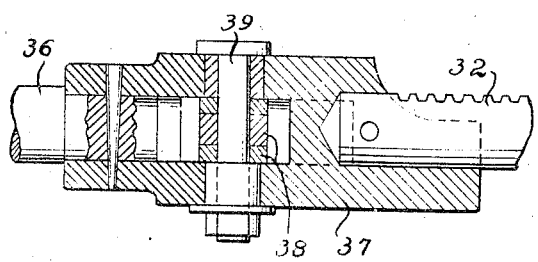
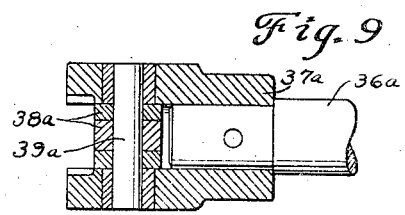

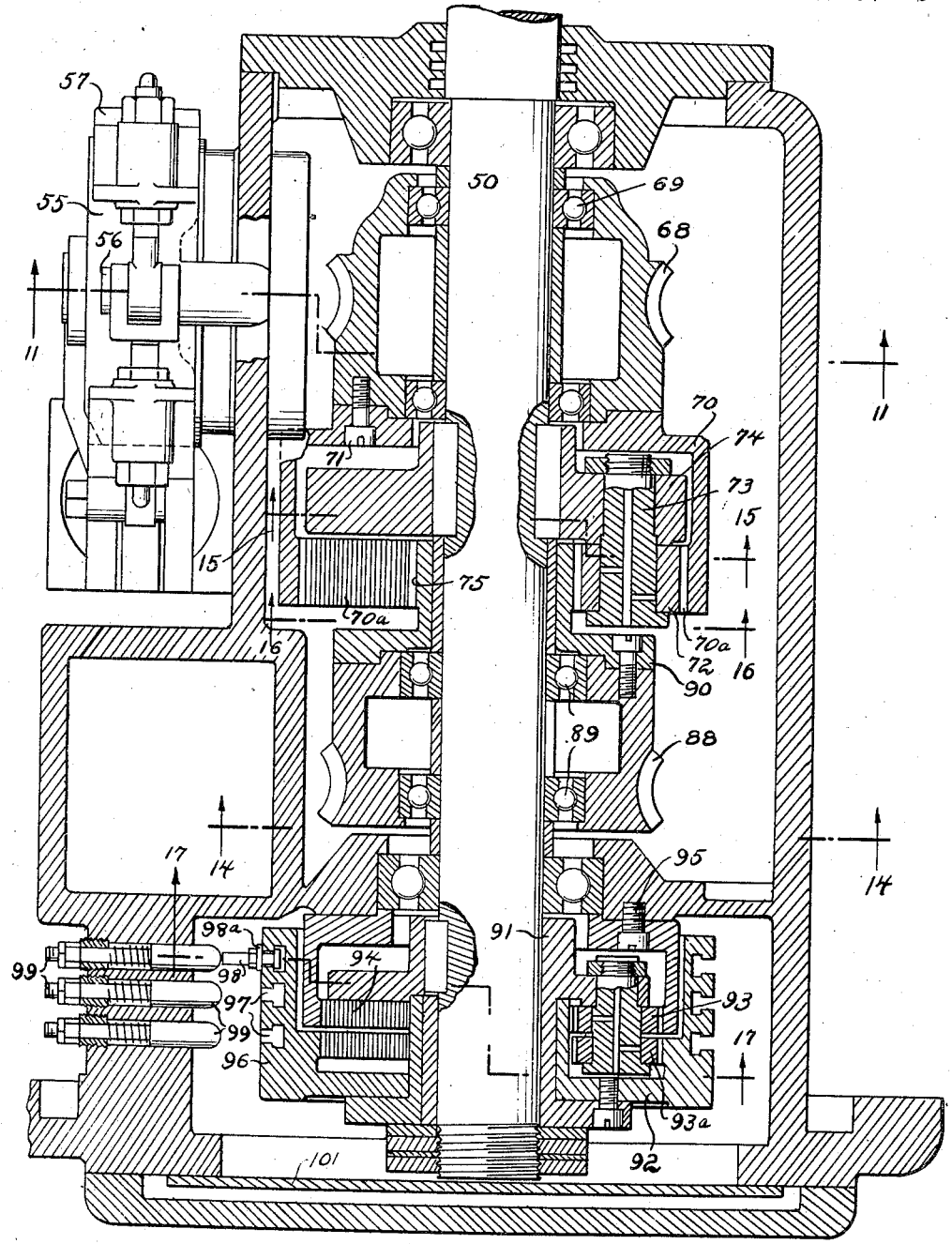

INVENTOR.
William Sinclair
BY Swan, Frye & Hardesty
ATTORNEYS.

Dec. 14, 1937. W. SINCLAIR 2,102,227
CONVEYER FEED MILLING MACHINE
Original Filed Feb. 24, 1930 12 Sheets-Sheet 9

INVENTOR.
William Sinclair
BY
Swan, Type & Hardesty
ATTORNEYS.

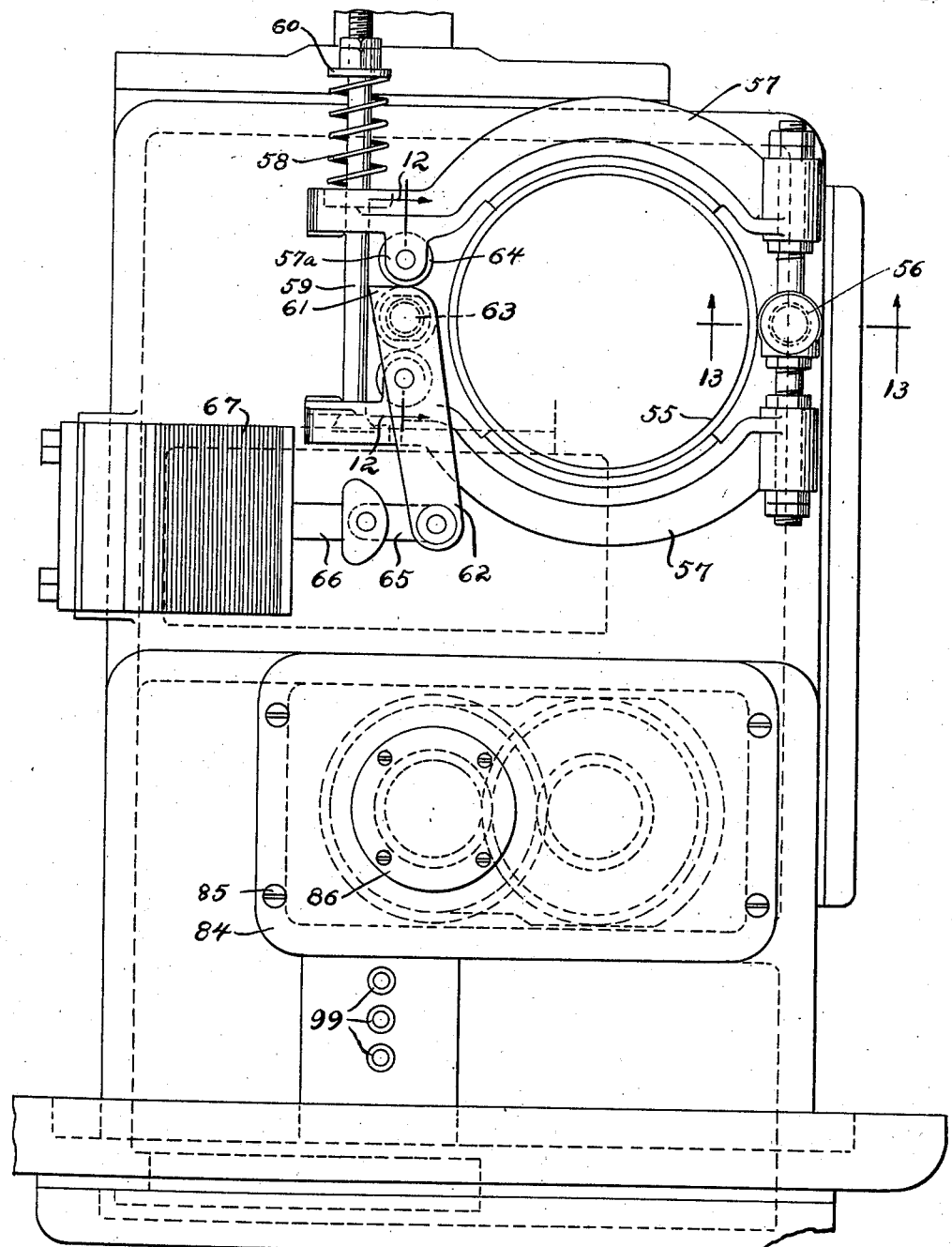

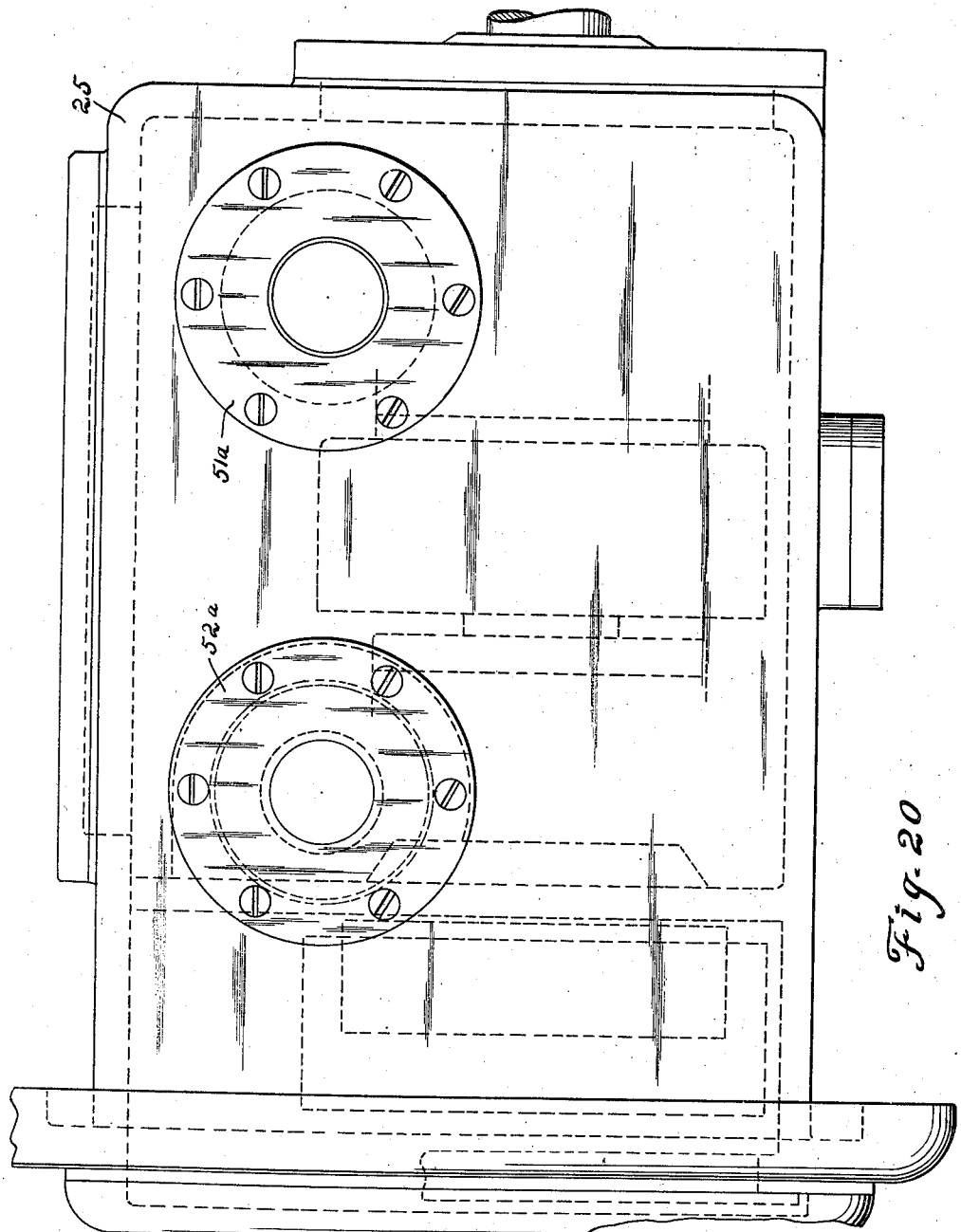

Dec. 14, 1937.                    W. SINCLAIR                      2,102,227
                         CONVEYER FEED MILLING MACHINE
                    Original Filed Feb. 24, 1930      12 Sheets-Sheet 12

INVENTOR.
William Sinclair
BY Swan, Frye & Hardesty
ATTORNEYS.

Patented Dec. 14, 1937

2,102,227

UNITED STATES PATENT OFFICE 2,102,227

CONVEYER FEED MILLING MACHINE

William Sinclair, Detroit, Mich., assignor to Production Engineering Company, Detroit, Mich., a corporation of Michigan Original application February 24, 1930, Serial No. 430,688. Divided and this application August 22, 1934, Serial No. 740,880

2 Claims. (Cl. 74—282)

This invention relates to milling machines or like machine tools to which the work to be machined is intermittently supplied, as by conveyers, and the present application constitutes a division of my previously filed application Serial No. 430,688 filed February 24, 1930 and issued September 25, 1934 as Patent No. 1,974,660.

One of the objects of this invention is the provision of a machine designed entirely on a unit principle whereby any number of unit heads within the capacity of the machine can be mounted in desired positions relatively to a movable work support.

Another object of the invention is the arrangement of means whereby a conveyer section carried by the machine may be utilized as a portion of the conveyer system whenever desired, and also utilized as a means for supporting the work during the machining operation, at which time the work is fed at predetermined rates of speed by other means than the conveyer system.

A further object of this invention is the provision of a conveyer feed section with rollers adjustable vertically, whereby the conveying rollers may be lowered whenever desired to enable the use of such conveyer section as a movable work table upon which the work to be machined may be conveniently clamped.

A further object of this invention is the arrangement of power-actuated means for clamping the work upon the conveyer section interlocked with said rollers which may be lowered and adapted to simultaneously adjust the position of the rollers and move the clamps into operative positions.

A further object of the invention is the provision of improved feeding means for sliding the clamped work past the cutters of the milling machine, whereby different rates of speed may be automatically secured during different portions of the operation.

Other objects and advantages will be apparent from the following description in which reference is made to the accompanying drawings showing a preferred embodiment of my invention and wherein similar reference numerals designate similar parts throughout the several views.

In the drawings:

Figure 2 is an end view thereof;

Figure 3 is a plan view thereof;

Figure 4 is a horizontal section showing the work-clamping and roller-adjusting means for facilitating the clamping of the work to be machined;

Figure 5 is a vertical longitudinal section taken substantially on the line 5—5 of Figure 4;

Figure 11:
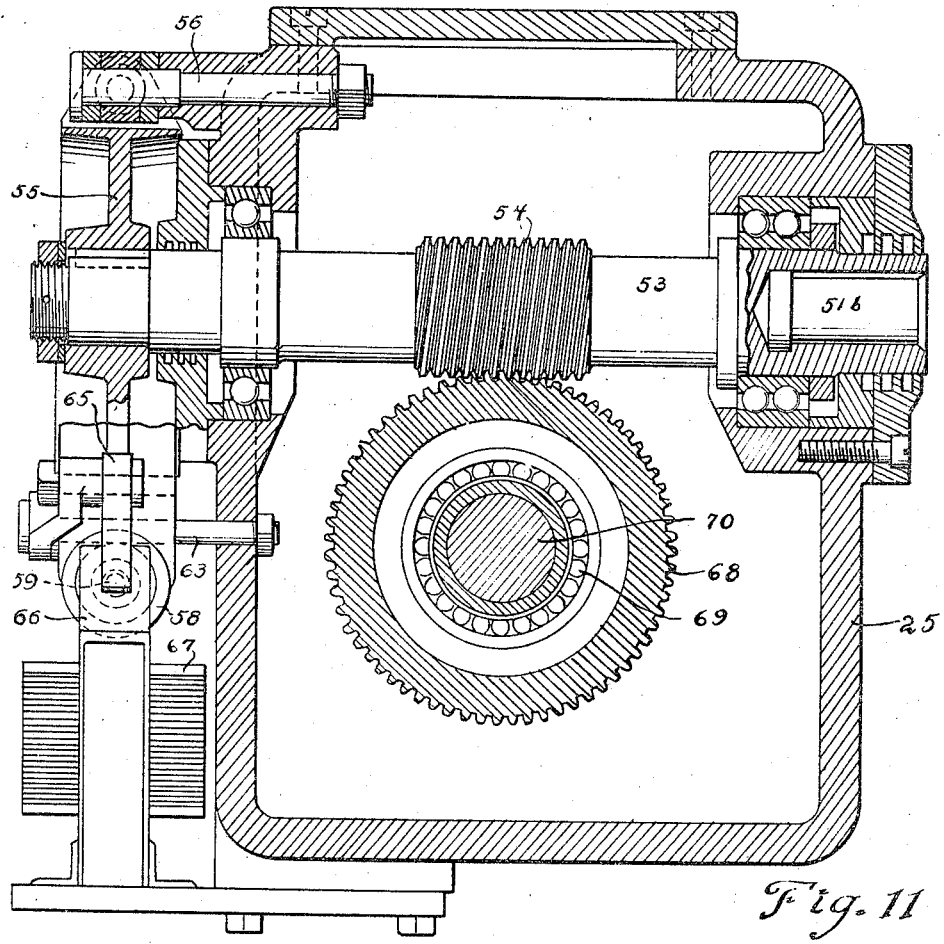
Figure 12:
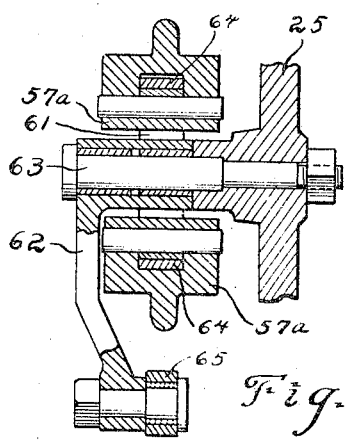
Figure 13:
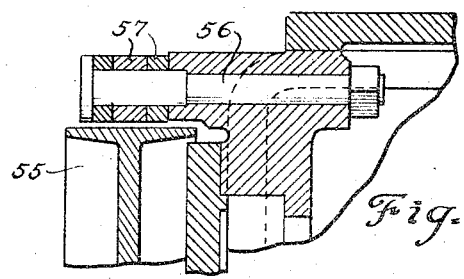
Figure 14:
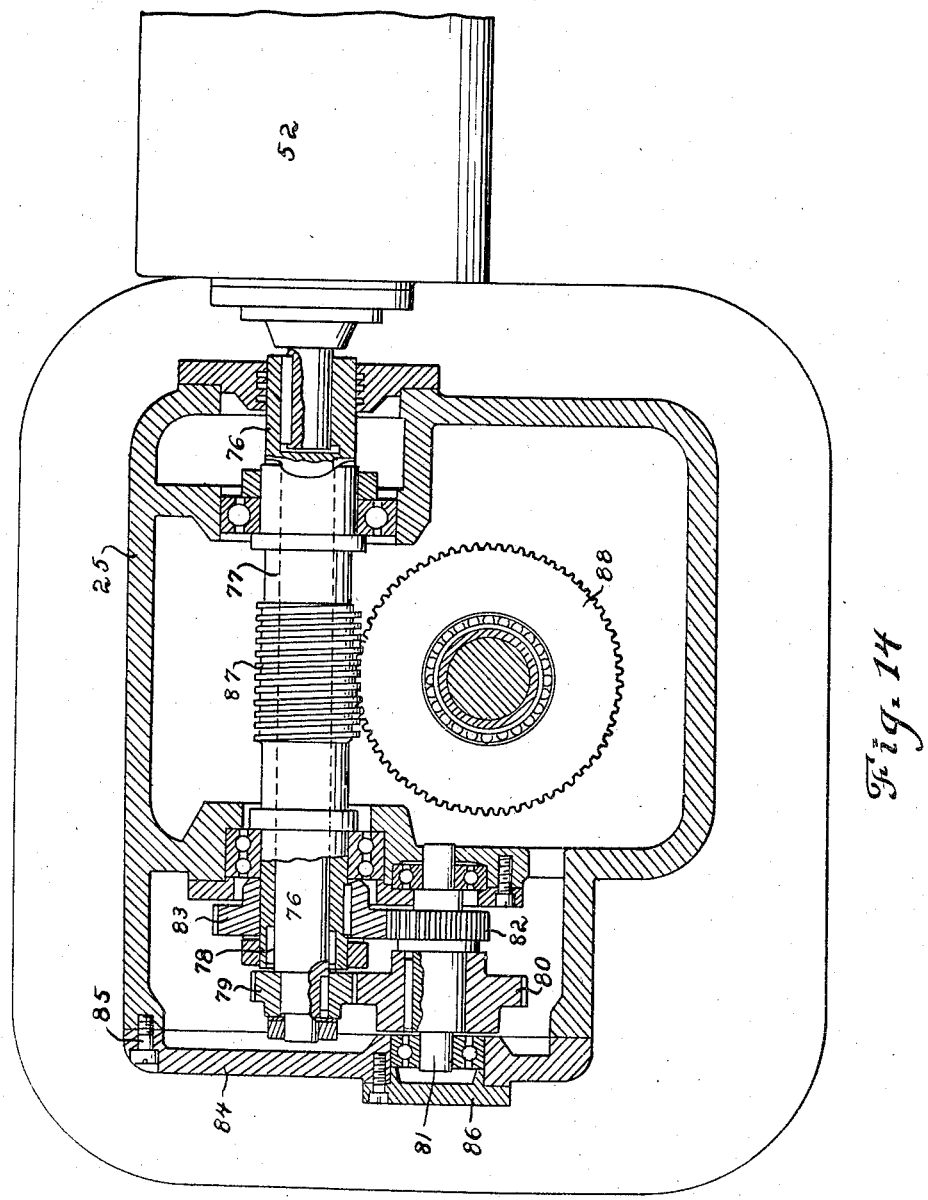
Figure 15:
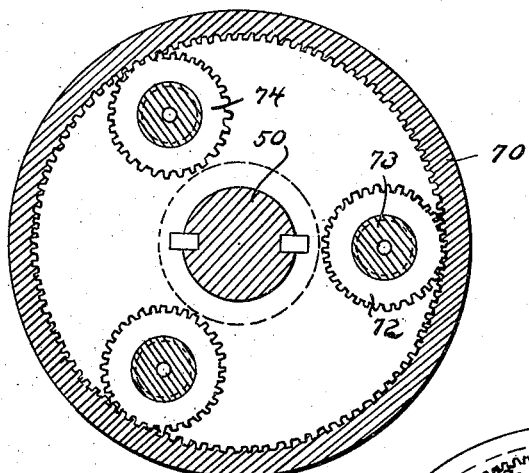
Figure 18:
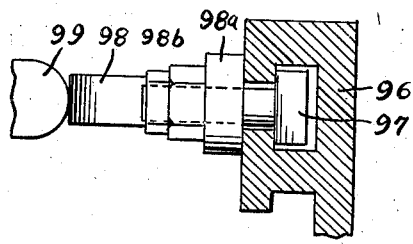
Figure 16:
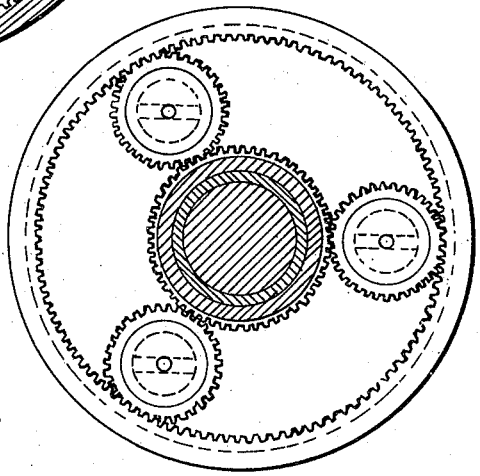
Figure 17:
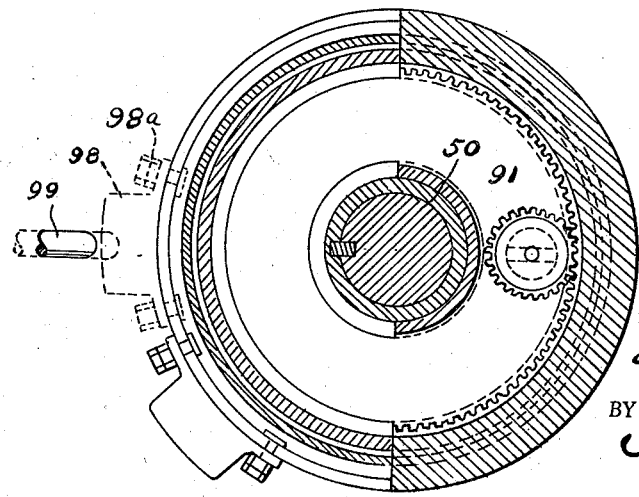
Figure 22:
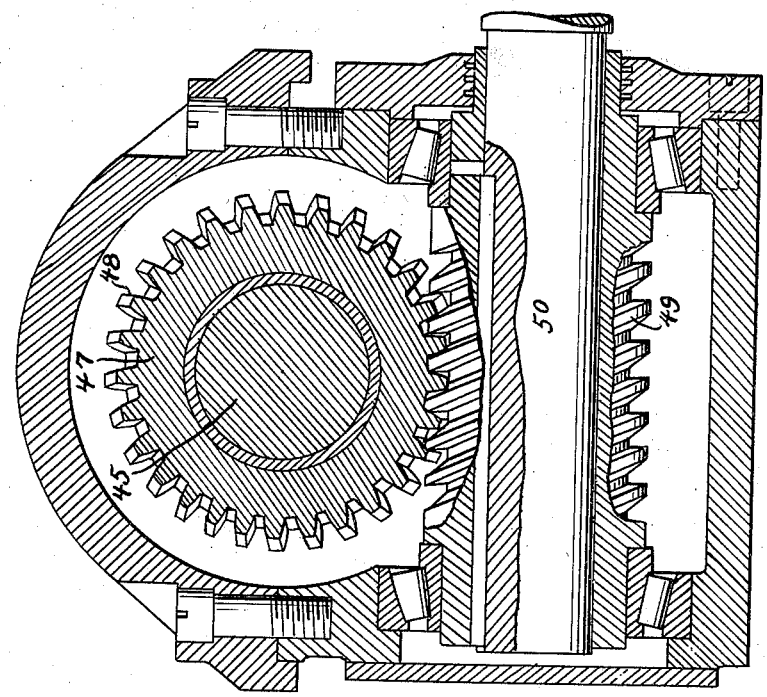
Figure 21:
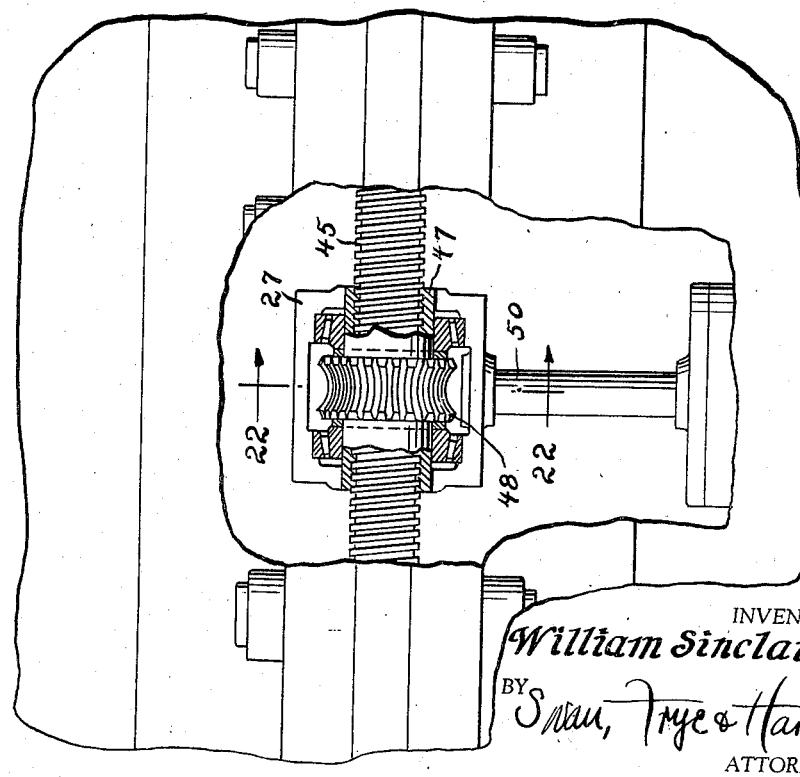

Figures 6 and 7 are detail vertical cross sections taken substantially on the lines 6—6 and 7—7 of Figure 4;

Figure 8 is an enlarged detail section showing the mounting of the toggle levers of the clamping mechanism and the rack of the roller adjusting mechanism to one of the power operated rods;

Figure 9 is a similar view of the connection of the other power operated rod to additional clamping means;

Figure 10 is an enlarged horizontal sectional view through a portion of the feed mechanism for the clamped work, taken substantially on the line 10—10 of Figure 2;

Figure 11 is a vertical cross section taken substantially on the line 11—11 of Figure 10;

Figure 12 is an enlarged detail sectional view of a portion of the brake operating means;

Figure 13 is an enlarged detail sectional view of the mounting of the pivot pin means for the brake shoes, taken substantially on the line 13—13 of Figure 19;

Figure 14 is an enlarged vertical sectional view taken substantially on the line 14—14 of Figure 10;

Figures 15, 16 and 17 are respectively detail vertical sections taken substantially on the lines 15—15, 16—16 and 17—17 of Figure 10;

Figure 18 is an enlarged detail sectional view showing a preferred manner of mounting one of the adjustable switch control lugs;

Figure 19 is an enlarged side elevation of the housing for the drive gearing for the feed-shaft with one of the cover plates removed;

Figure 20 is an enlarged end elevation of such housing with the motors removed;

Figure 21 is an enlarged detail horizontal section through a portion of the threaded feed shaft and intermeshing threaded sleeve carried by the movable work support, and adjacent parts; and Figure 22 is a detail vertical section taken substantially on the line 22—22 of Figure 21.

Figure 1:
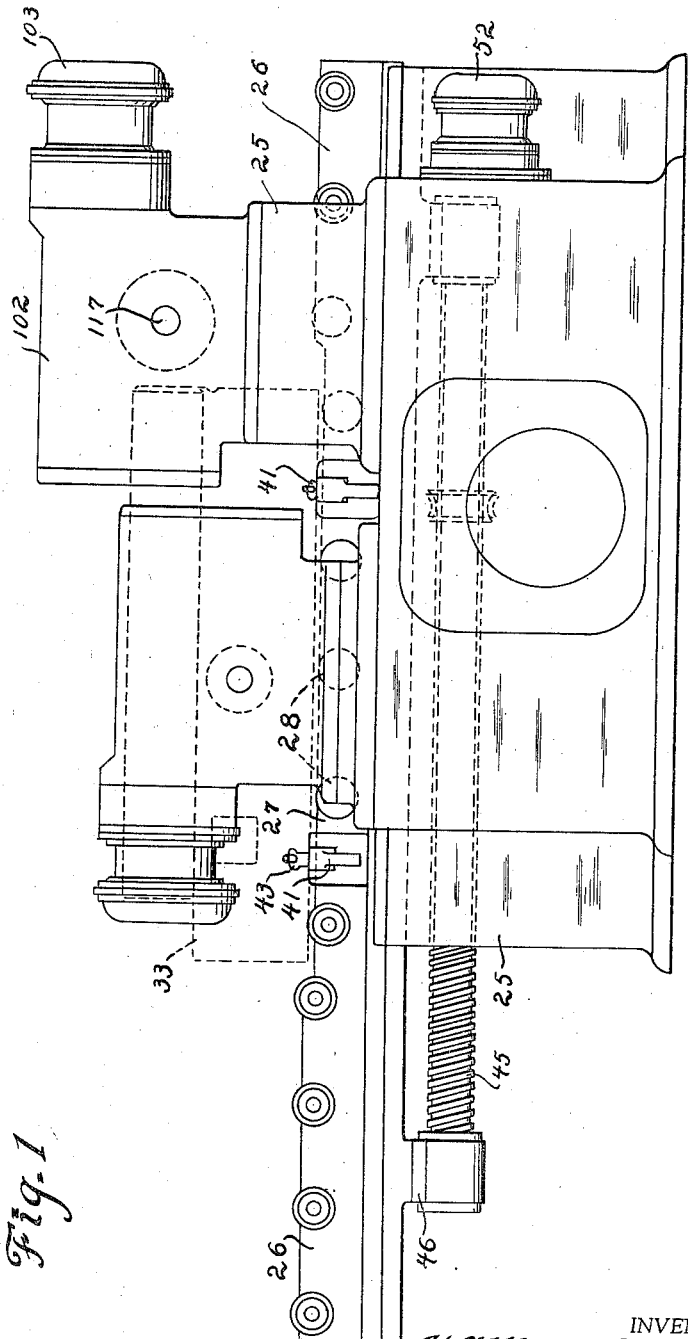
Figure 1 is a side elevation of my improved milling machine arranged to receive work from standard roller conveyers.

Referring now to the drawings, the numeral 25 designates a bed for my improved machine, and herein shown as having spaced side portions on which may be mounted one or more machine tool units on opposite sides of and in position for the tools thereof to engage the articles to be machined, which articles are advanced past the various units by feed mechanism located between or housed within the side portions of the bed 25. The machine tool units may be entirely self-contained and mounted for adjustment toward or away from each other or toward or away from the articles to be machined. The height of the supporting bed and units is preferably extremely low to allow the machine to rest upon a floor without the necessity of excavating in order that the work supporting table may be in line with the usual forms of conveyer systems now utilized in factories and other buildings. Slidable in the bed 25 is a table assembly comprising conveyer portions as 26 carrying ordinary conveyer rollers as 26ª; (note Figures 1 and 3), and a central work supporting portion 27 arranged between and shown as integral with sections 26. The travel of the table assembly is so related to the conveyer system (not shown) with respect to which the machine is installed that the work may be conveniently picked up from the feeding conveyer and delivered to the receiving conveyer when the table assembly reaches its initial and final positions, respectively. Articles may thus be continuously moved upon the conveyer system with the work supporting table of my machine forming in effect a part of the conveyer system. When my improved machine is being operated, however, the conveyer system is utilized to bring the articles to be machined to the work table, and then, after the machining operations have been completed, to convey such articles from the machine. As best shown in Figures 3 and 4, the central portion 27 of the work table is provided with a plurality of retractable pairs of spaced rollers 28 which are normally in alignment with the rollers 26ª of the conveyer system, the upper surfaces of the rollers being then in substantially the same horizontal plane. However, as best shown in Figures 1 and 6, the rollers 28 of the central work table section 27 are mounted upon crank journals 29 arranged eccentrically upon cross shafts 30, whereby a partial revolution of such cross shafts 30 will serve to lower the rollers 28 from their positions as shown in Figure 4, so that an article to be machined can thereby be lowered from engagement with only the rollers 28 into engagement with surface of the work supporting table (note Figure 7). The cross shafts 30 are journalled in spaced side portions of the work table and carry, centrally of the shafts, pinions 31 which mesh with a rack 32 arranged longitudinally of the work table and movable to partially rotate the cross shafts 30 whenever desired. When the rollers 28 are lowered sufficiently the articles to be machined, as shown, for example, in dotted lines at 33 in Figures 1 and 7, are lowered until the lower portion of the article 33 rests upon adjustable face plates 34 fixed upon the upper surface of work table section 27, and means are provided for suitably clamping the articles 33 in such position, as hereinafter pointed out. The rollers 28 of the work table are simultaneously lowered or raised upon movement of the rack 32, and the movement of such rack is preferably controlled by suitably operating a plunger (not shown) within a cylinder 35, as by compressed air or hydraulic power. The stem 36 of the plunger is connected with one extremity of a fitting 37, while the rack 32 is secured in the opposite extremity of such fitting (note Figures 4 and 5). The fitting 37 is also employed in the illustrated embodiment in the operation of the means for clamping the work upon the work table. As best shown in Figures 4 and 5, the inner extremities of a pair of toggle links 38 are pivotally mounted upon a vertically disposed pin 39 suitably secured in the fitting 37, the central portion of the fitting being slotted to permit the passage of the inner portions of the toggle links. The outer extremities of the toggle links 38 are pivotally connected with a pair of slide blocks 40 guided for reciprocating movement laterally of the work table (note Figure 7), and are formed with central longitudinal slots for the reception of the lower extremity of a pair of clamping arms 41, herein shown as bell-crank-levers, pivoted intermediate their ends upon suitable shafts 42 suitably journaled in ears carried by the work table. The lower arm of each clamping lever 41 preferably terminates in a rounded knob, the periphery of which is engaged by the inner wall of the slot in its slide block 40 as long as the slide block is being forced outwardly through suitable pressure exerted upon the toggle links 38, whereby the upper arm of each clamping lever 41 is swung inwardly and downwardly toward the face plates 34 upon the work table to thereby clamp an article as 33 to be machined firmly thereupon. Adjustable set screws 43 may be used for contacting the articles to be machined, or suitable intermediate members may be employed between the set screws and the articles, as desired. A pin 44 is fixed within the slot in each slide block 40 in position to engage the periphery of the knob on the lower arm of the clamping lever therein whenever the slide block 40 is being moved inwardly, to thereby rock the clamping lever to swing the set screw 43 away from the articles to be machined. Inward movement of the slide blocks 40 is secured by a reversal of the outward movement as above described, the fluid pressure being directed to the opposite side of the plunger in the cylinder 35 in the usual manner of fluid pressure actuated devices. The clamping levers 41 and toggle links 38 above described are moved outwardly and inwardly simultaneously with the movement of the rack 32, and it is obviously possible to secure a plurality of fittings 37 at various positions upon the rack bar 32 for connection with additional clamping levers as desired. It is possible to actuate additional clamping members through other mechanism than that operating the rack bar 32, and for purposes of illustration I have shown herein a pair of clamping levers 41ª identical in construction and mounting upon the work table as the above described clamping levers 41, but which are operated by means of separate operating mechanism. As best shown in Figures 4 and 5, the clamping levers 41ª are operably connected with toggle links 38ª, the inner extremities of which are pivotally mounted upon the vertical pin 39ª arranged in a slotted head 37ª fixed on the free extremity of a plunger stem 36ª, the opposite end of which is secured to a plunger (not shown) reciprocating within a cylinder 35ª for movement in opposite directions by fluid pressure. If desired, the valves for controlling the pressure fluid admitted to the opposite ends of the cylinders 35 and 35ª may be simultaneously operated by suitable mechanism, or may be independently operated.

When an article to be machined has been lowered upon the work table and clamped in position thereon, it may be moved with the work table past the several machine tools operated by the units mounted upon the bed 25. The means herein disclosed for moving the work table and work clamped thereon past the machine tools is best shown in Figures 1, 2 and 10, and comprises an elongated feed screw 45 having unthreaded ends fixed in suitable hangers 46 rigidly depending from the adjacent conveyer sections 26 of the work table (note Figure 1); a threaded actuating nut 47 meshing with the feed shaft and journaled in suitable bearings carried by the bed, and means for turning the nut to move the table including a worm gear 48 formed upon the nut (note Figure 21) meshing with a driving worm 49 splined upon a shaft 50 which is driven at various speeds by the drive mechanism, mounted in the bed and now to be described.

By virtue of my improved means for driving the feed shaft 45 and the work table, it is possible to secure a very flexible control for the traverse of the work past the machine tool cutters or the like. For example, it is possible to secure a rapid traverse for approach of work to a cutter or cutters, slow traverse for feeding of the work past the cutters, rapid traverse of the work between spaced cutters, and rapid reverse traverse, all entirely automatically.

The feed mechanism for operating the work table is designed to be secured upon or housed within a portion of the bed 25 and carries its own motors 51 and 52 respectively for imparting movement to the rapid and slow traverse mechanism (note Figure 2). In the illustrated embodiment the feed mechanism is housed within a portion of the bed 25 which is provided with suitable apertures and bearing openings for the various gearings, and with machined surfaces 51a and 52a for mounting the motors 51 and 52 (note Figure 20). The rapid traverse motor 51 has its shaft 51b suitably connected with one extremity of a longitudinally directed worm shaft 53 (note Figures 10 and 11) carrying a worm pinion 54 interiorly of the housing formed by the bed 25, and a brake drum 55 exteriorly of the housing, the shaft 53 beeing journaled in suitable bearings supported in the housing. Suitable oil seals are also utilized to prevent leakage of lubricant from the housing around the shaft 53. Pivotally mounted upon a fulcrum pin 56 secured upon the housing are a pair of brake shoes 57 (note Figures 11 and 19), arranged to encircle the major portion of the brake drum 55 and spring-pressed toward the brake drum, as by means of the coil spring 58 having one extremity abutting the lower portion of one of the brake shoes and surrounding an elongated pin 59 secured to the lower extremity of the opposite brake shoe and passing through an aperture in the adjacent brake shoe. An adjustable abutment 60 on the pin 59 contacts the other extremity of the coil spring 58 and provides any desired initial tension upon the spring. The brake shoes are normally held in contact with the brake drum 55 by the pressure of the spring 58. A cam 61 is arranged between the lower portions of the brake shoes and carried by an operating lever 62 fulcrumed upon a suitable shaft 63 secured in the housing 25 (note Figures 12 and 19), the surface of the cam 61 being contacted by oppositely directed rollers 64 mounted between ears 57a on the brake shoes 57, the pressure of the spring 58 serving also to maintain the rollers 64 in constant engagement with the cam 61. The free extremity of the cam-operating lever 62 is pivotally connected with the upper extremity of a link 65, the lower extremity of which is pivoted upon a movable armature 66 of a solenoid coil 67 preferably arranged substantially as shown in Figures 11 and 19. Whenever the solenoid coil is energized its armature 66 is drawn downwardly into the solenoid coil and rocks the lever 62 to swing the cam 61 through a partial revolution to thereby force the brake shoes away from the brake drum against the tension of the spring 58. The switch for closing the circuit for energizing the solenoid 67 is preferably included in the same circuit as utilized for energizing the rapid traverse motor 51 so that the solenoid remains energized as long as the motor is being energized, and the solenoid is de-energized whenever it is desired to stop the motor 51. Upon de-energization of the solenoid 67 the spring 58 returns the brake shoes 57 into engagement with the brake drum, rocking the lever 62 to its normal raised position by the pressure of the shoes against the cam 61.

The worm pinion 54 engages a worm gear 68 (note Figures 10 and 11) mounted upon spaced roller bearings 69 encircling the shaft 50 arranged transversely of my improved machine and carrying the worm pinion 49 above referred to (note Figures 10 and 22). The body portion of the worm gear 68 is secured to a drum 70, as by screws 71, a portion of the inner periphery of the drum 70 being formed with gear teeth 70a meshing with a plurality of pinions 72 mounted on stub shafts 73 extending from the arms of a spider 74, the hub portion of which is keyed or otherwise suitably secured to the shaft 50 so that the shaft must rotate with the spider 74 (note Figures 10 and 15). The teeth of the pinions 72 also mesh with the teeth of an externally toothed pinion 75 arranged in vertical alignment with the teeth 70a of the internally toothed drum 70 and accordingly forms the central or sun pinion of a planetary gear system by means of which both the rapid traverse mechanism and the slow traverse mechanism may drive the same shaft 50. The rapid traverse driving mechanism operates through the internally toother drum 70 so that whenever the drum 70 is rotated from the motor 51 the spider 74 will be rotated from the drum, the several pinions 72 revolving around the central pinion 75 as a track. Since the spider 74 is splined to the shaft 50, the shaft revolves at the same speed as the spider and thereby drives the worm pinion 49 and worm gear 48, which, as above described, is mounted upon a threaded driving nut for the work table rotatable but held against axial movement in the bed and meshing with the feed screw 45, carried by the table assembly so that the latter may be driven longitudinally with the feed screw by rotating the nut. Accordingly the rotation of the worm gear 48 and nut 47 will serve to advance or retract the work table and feed screw 45 according to the direction of rotation. The motors 51 and 52 are preferably of the reversible type, and may be controlled by suitable switches, substantially as hereinafter described, for reversing the direction of rotation of the motors and accordingly of the mechanisms driven thereby.

The slow traverse mechanism as herein shown is driven from the motor 52, the shaft 52a of which is suitably connected with one extremity of a shaft 76 (note Figure 14) extending longitudinally of my improved machine and through a hollow sleeve 77 in the ends of which it is suitably journaled, as by roller bearings 78. On the opposite end of the shaft 76 is keyed a pinion 79 meshing with a gear 80 on a stub shaft 81 arranged substantially vertically below the shaft 76 and also carrying a pinion 82 meshing with a gear 83 fixed on the sleeve 77 which encircles the major portion of the shaft 76. The intermeshing gears 79 and 80 form pick-off gears and are mounted so that they may be readily replaced by other gears of various sizes and relations of teeth whereby the speed of the motor 52 may be variously reduced before reaching the sleeve 77. To this end a removable plate 84 is secured to the exterior of the housing formed in the bed 25, as by a plurality of screws 85, and the outer bearing for the stub shaft 81 is also carried by the removable plate 84 and covered by a smaller removable cap member 86 (note Figures 14 and 19). The sleeve 77 carries a worm gear 87 which meshes with the worm pinion 88, which, as best shown in Figure 10, is mounted upon spaced bearings 89 encircling the shaft 50 hereinbefore referred to. The body portion of the worm pinion 88 also carries a flange 90 to the central portion of which is secured the central or sun pinion 75 of the planetary differential mechanism for driving the shaft 50. When the worm pinion 88 is rotated from the motor 52 the sun pinion 75 is rotated at a speed proportionately less than that of the motor, depending upon the ratios of the various reducing gears arranged between the motor 52 and the worm pinion 88, and the worm pinion 88 simultaneously rotates the sun pinion 75 to drive the planetary pinions 72 and spider 74 to thereby rotate the shaft 50, and accordingly drive the nut 47 to advance or retract the work table relatively to the fixed feed screw 45 according to the direction of rotation.

In operation, the movement of the work table and articles clamped thereon may be had at various speeds in either direction. When only the rapid traverse motor 51 is energized the shaft 50, and accordingly the work table, are moved in a desired direction through the rotation of the internally toothed drum 70 which drives the spider 74, attached to the shaft 50, at a predetermined speed with the central or sun pinion 75 operating as a track for the movement of the gears 72 carried by the spider. When only the slow traverse motor 52 is energized the shaft 50 is rotated at a much slower speed because of the intervention of the plurality of reducing gears arranged between the motor 52 and shaft 50, the spider 74 attached to the shaft 50 being driven by the sun pinion 75 and the pinions 72 of the spider advancing around the teeth 70ª of the internally toothed drum 70 as a track. Should it be desired, however, to secure an even faster movement of the shaft 50 than is secured from the rapid traverse motor 51, it is only necessary to simultaneously energize both of the motors 51 and 52, whereupon the spider 74, attached to the shaft 50, will be simultaneously driven from both the internally toothed drum 70 and the sun pinion 75 rotating in the same direction. Such movement, for example, may be utilized for quickly returning the work table to its initial position after the work on the article to be machined has been completed.

Automatic controls for the energization or deenergization of the motors 51 and 52 and solenoid 67 whenever desired, as well as the motors of the cutter units hereinafter referred to, may be secured by the mechanism now to be described. Keyed or otherwise suitably secured to the shaft 50 is a second spider 91 (note Figures 10 and 17), the arms of which carry stub shafts 92 on which are mounted pinions 93, herein shown as having comparatively wide teeth divided substantially centrally by a groove 93ª so that substantially two pinions are formed as far as the teeth are concerned. The pinions 93 mesh with both an internally toothed track 94 secured upon a flange integral with the housing 25, as by screws 95, and an internally toothed drum 96 arranged to encircle the shaft 50 but unattached thereto so that the drum 96 may rotate at a lesser speed than the shaft 50. The circular track 94 has a lesser number of teeth than the drum 96, as, for example, three less teeth than in the adjacent toothed portion of the drum 96. By virtue of this arrangement, whenever the shaft 50 is rotated by either or both of the mechanisms hereinbefore described as driven from the motors 51 and 52, the spider 91 will be simultaneously rotated at the same speed as the shaft 50. The pinions 93 upon the spider 91 will revolve around the fixed track 94 and simultaneously mesh with the toothed portion of the internally toothed drum 96, but because of the different number of teeth in the track 94 and drum 96, the drum 96 will be very slowly advanced or retracted relatively to the shaft 50, according to the direction of rotation. The differential toothed gears on the track 94 and drum 96 are arranged so that the drum 96 will make one complete revolution during the full movement of the work table along the threaded portion of the feed screw 45 in either direction, and, of course, this rotation of the drum 96 is dependent upon the speed of rotation of the shaft 50 in its driving of the work table.

The periphery of the drum 96 is provided with a plurality of spaced circumferential grooves 97, preferably substantially T-shaped in cross section, (note Figure 10), and in these grooves may be positioned a plurality of cams 98 for co-action with one or more spring-pressed plungers 99 arranged in the housing 25 in the paths of travel of the cams 98. The cams 98 may be clamped at any desired position around the drum 96, as by nuts 98ª engaging the periphery of the drum 96 and threaded upon bolts, the heads of which are arranged within the wider portions of the slots 97 and pulled firmly into engagement with the outer walls of such wider portions. A lock nut 98ᵇ may also be employed to insure the maintenance of the clamped cam in its desired position (note Figures 17 and 18). The plungers 99 are arranged to actuate electric switches of the usual or any desired type, and by this means the motors 51 and 52 and the solenoid 67 may be automatically energized or de-energized whenever desired and for as long a time as desired, and, if desired, additional cams 98 may be carried upon the drum 96 for automatic control of one or more of the cutter heads or like tools used with my machine for working upon the articles 33 to be machined. It is also obvious that the cams 98 may be shifted as desired to suit changes in set-up of the machine, and to enable ready access to the cams 98 I preferably provide a removable cover plate 100 (note Figure 10) upon the end of the housing 25 adjacent the drum 96. However, to retain oil or other lubricant within the housing adjacent the shaft 50 and associated mechanism, I preferably provide a plate 101 closing the lower portion of the opening closed by the cover plate 100, the plate 101 being of sufficient height to prevent out-pouring of oil when the cover plate 100 is removed but permitting access to the upper portion of the drum 96. To shift or remove a clamped cam member 98, it is only necessary to revolve the drum 96 until the desired cam 98 is adjacent the upper portion of the housing.

The cutter heads utilized for working upon the articles 33 to be machined are preferably self-contained units arranged to be mounted on the bed 25 of the machine in various positions, as desired. As best shown in Figures 2 and 3 a plurality of cutter heads 102 are arranged on opposite sides of the work table 27 and, if desired, a plurality of such cutter heads on the same side of the work table, or in various positions above the work table. Each unit head is driven by a separate motor 103 fixed upon the unit, and connected through the unit to drive its cutter as 118. The internal construction of such units forms no part of my present invention, however, and accordingly is not shown.

It is to be understood that the work table feed mechanism may be constructed as a unit and located wherever desirable relatively to the remainder of the machine. Also that suitable lubrication means may be provided for the separate cutter units and the work-table feed mechanism as desired.

What I claim is:

1. Means for controlling the traverse of a machine tool or the like comprising, in combination with a shaft, planetary gearing mounted thereon including a sun gear loose on the shaft, a cage fast upon the shaft, planetary gears carried by the cage and meshing with the sun gear, another gear of different size from the sun gear, also concentric with the shaft and meshing with said planetary gears, independent driving means for said sun gear and said other gear, including a worm connected to said sun gear, a worm connected to said other gear, and an independent motor connected to each worm, whereby the shaft is actuable at different speeds depending upon which of said motors is, or whether both motors are, running, and whereby when either motor is at rest, the gear to which it is connected is held against rotation by its worm, controlling means for said motors, including switching means drivable by said shaft, a worm wheel for driving each of said sun gear and other gear, said worm wheels also being concentrically carried by said shaft, and meshing with said worms to prevent turning of the sun gear or other gear when the driving motor of either is at rest, said switching means including a control member also concentrically mounted on and drivable by the shaft, and reduction gearing connecting the shaft and control member.

2. Means for controlling the traverse of a machine tool or the like comprising, in combination with a shaft, planetary gearing mounted thereon including a sun gear loose on the shaft, a cage fast upon the shaft, planetary gears carried by the cage and meshing with the sun gear, another gear of different size from the sun gear, also concentric with the shaft and meshing with said planetary gears, independent driving means for said sun gear and said other gear, including a worm connected to said sun gear, a worm connected to said other gear, and an independent motor connected to each worm, whereby the shaft is actuable at different speeds depending upon which of said motors is, or whether both motors are, running, and whereby when either motor is at rest, the gear to which it is connected is held against rotation by its worm, controlling means for said motors, including switching means drivable by said shaft, a worm wheel for driving each of said sun gear and other gear, said worm wheels also being concentrically carried by said shaft, and meshing with said worms to prevent turning of the sun gear or other gear when the driving motor or either is at rest, said switching means including a control member also concentrically mounted on and drivable by the shaft.

WILLIAM SINCLAIR.